United States Patent
Deng et al.

(10) Patent No.: US 8,854,017 B2
(45) Date of Patent: Oct. 7, 2014

(54) METHOD AND SYSTEM FOR CONTROLLING A GENERATOR

(71) Applicants: Heng Deng, Brande (DK); Thomas Esbensen, Herning (DK); Gustav Hoegh, Herning (DK)

(72) Inventors: Heng Deng, Brande (DK); Thomas Esbensen, Herning (DK); Gustav Hoegh, Herning (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/900,616

(22) Filed: May 23, 2013

(65) Prior Publication Data

US 2013/0320938 A1    Dec. 5, 2013

(30) Foreign Application Priority Data

Jun. 1, 2012  (EP) ..................................... 12170522

(51) Int. Cl.
    *H02P 9/14* (2006.01)
(52) U.S. Cl.
    USPC .............................. 322/90; 322/46
(58) Field of Classification Search
    USPC ............................... 322/46, 89, 90
    See application file for complete search history.

(56) References Cited

U.S. PATENT DOCUMENTS

| | | | | |
|---|---|---|---|---|
| 3,793,544 A * | 2/1974 | Baumgartner et al. | ....... | 320/123 |
| 4,009,431 A * | 2/1977 | Johnson | ............................ | 322/7 |
| 4,045,718 A * | 8/1977 | Gray | .............................. | 320/123 |
| 4,239,978 A * | 12/1980 | Kofink | ............................ | 307/16 |
| 4,743,777 A * | 5/1988 | Shilling et al. | .................. | 290/46 |
| 4,786,852 A * | 11/1988 | Cook | .............................. | 322/10 |
| 5,708,346 A | 1/1998 | Schoeb | | |
| 6,049,196 A * | 4/2000 | Arai et al. | ........................ | 322/61 |
| 6,333,622 B1 * | 12/2001 | Fogarty et al. | .................. | 322/90 |
| 6,445,079 B1 * | 9/2002 | Gale et al. | ........................ | 290/31 |
| 7,227,340 B2 * | 6/2007 | Chen | ................................ | 322/24 |
| 8,193,654 B2 * | 6/2012 | Rickard | ........................... | 290/44 |
| 2006/0238053 A1 | 10/2006 | Dever | | |
| 2008/0164697 A1 | 7/2008 | Buecker | | |
| 2009/0001917 A1 | 1/2009 | Hofmeister | | |

FOREIGN PATENT DOCUMENTS

EP          0939480 A2    9/1999

* cited by examiner

*Primary Examiner* — Nicholas Ponomarenko (57) ABSTRACT

A method for controlling a generator having a rotor with a plurality of magnets and a first stator winding and a second stator winding, electrically separate from the first stator winding is provided. The rotor rotates around a rotation axis perpendicular to a radial direction relative to the stator windings. The method includes allowing flow of a first electric current through the first stator winding, thereby generating a first radial force having a first magnitude and acting between the first stator winding and the rotor, and allowing flow of a second electric current through the second stator winding, thereby generating a second radial force having a second magnitude and acting between the second stator winding and the rotor, wherein the first magnitude is different from the second magnitude resulting in a net generator generated radial force generated by the first stator winding and the second stator winding at the rotor.

18 Claims, 3 Drawing Sheets

METHOD AND SYSTEM FOR CONTROLLING A GENERATOR

CROSS REFERENCE TO RELATED APPLICATIONS

The present application claims priority to European Patent Office application No. 12170522.2 EP filed Jun. 1, 2012 the entire content of which is hereby incorporated herein by reference.

FIELD OF INVENTION

The present invention relates to a method and to a generator control system for controlling a generator having a rotor with plural magnets and at least a first stator winding and a second stator winding electrically separate or isolated from the first stator winding.

ART BACKGROUND

A wind turbine comprises a rotor having one or more rotor blades connected to the rotor and being supported by a bearing. Further, the rotor is mechanically connected to a generator to generate electric energy from the mechanical rotational energy. The mechanical bearing supporting the rotor is subjected to stress and mechanical loads during operation. Thereby, a key factor in determining the life time of the mechanical bearing is the amplitude and direction of the forces acting on the bearing and the number of rotations travelled at a given load situation. The forces acting on the bearing may include radial and axial forces and bending moments or a combination of these forces.

In order to withstand the high loads acting on the bearings the bearings have been designed and sized for withstanding the highest loads expected during operation of the wind turbine. Thereby, the bearings become heavy and expensive.

There may be a need for a method and a generator control system for controlling a generator, in particular a generator of a wind turbine, wherein the loads acting on a bearing are reduced compared to a conventional system or method. Further, there may be a need for a method and a generator control system for controlling a generator, which enables to reduce the weight or size or costs of the bearing supporting the rotor. Further, there may be a need for a method and a generator control system for controlling a generator, wherein operating conditions, such as loads, noise emissions or stress and efficiency are improved compared to conventional systems or methods.

This need may be met by the subject matter according to the independent claims. Advantageous embodiments of the present invention are described by the dependent claims.

SUMMARY OF THE INVENTION

According to an embodiment of the present invention it is provided a method for controlling a generator having a rotor with plural magnets and at least a first stator winding and a second stator winding, electrically separate (isolated, in particular galvanically separated) from the first stator winding, the rotor being adapted to rotate, around a rotation axis perpendicular to a radial direction, relative to the stator windings, the method comprising: allowing flow of a first electric current (in particular comprising three phase current) through the first stator winding, thereby generating a first radial force having a first magnitude and acting between the first stator winding and the rotor; allowing flow of a second electric current (in particular comprising three phase current) through the second stator winding, thereby generating a second radial force having a second magnitude and acting between the second stator winding and the rotor; wherein the first magnitude is different from the second magnitude resulting in a net generator generated radial force generated by the first stator winding and the second stator winding at the rotor.

The rotor may be an outer rotor having plural magnets arranged radially outwards from the first stator winding and the second stator winding. The plural magnets may be permanent magnets. The stator may comprise a yoke or support structure having plural teeth pointing radially outwards (for an outer rotor) or radially inwards (for an inner rotor). The stator may be assembled from at least a first stator segment and a second stator segment. The first stator segment may comprise the first stator winding (in particular including for each of three phases one winding each) and the second stator segment may comprise the second stator winding (in particular including for each of three phases one winding each).

The first stator winding may be made of a single wire (or three wires, one per phase) wound around plural teeth belonging to the first stator segment. The second stator winding may be made of a single wire (or three wires, one per phase) wound around plural teeth of the second stator segment. In particular, the first stator winding may be arranged at an upper part and the second stator winding may be arranged at a lower part along a vertical direction along which a gravitational force acting on the rotor blades and the rotor is directed. The first stator winding is electrically separate or separated, i.e. electrically isolated, from the second stator winding. Thereby, the first electric current (or the three phase currents) flowing through the first stator winding may be independently set from the second electrical current (or the three phase currents) flowing through the second stator winding.

When the rotor rotates, the movement of the plural magnets may induce a first electric voltage in the first stator winding and may induce a second electric voltage in the second stator winding. For allowing flow of the first electric current the first stator winding may be connected to a converter enabling control of the first electric current. Thereby, the first electric current may be adjusted as needed. Also the second stator winding may be connected to a converter allowing adjustment of the second electric current. In particular, the first electric current and the second electric current may be adjusted such that the first radial force and the second radial force have different magnitudes. Thereby, it may be enabled to reduce a load on a mechanical bearing supporting the rotor or it may be enabled to improve the running condition of the generator or to improve the efficiency of the generator.

In particular, a gravitational force acting on the rotor, and particular acting on plural rotor blades connected at the hub, may be counteracted, at least partially, by the different radial forces generated by the first stator winding and the second stator winding, respectively. Thereby, in particular a direct drive turbine may be used in which the rotational speed of the hub equals the rotational speed of the rotor of the generator having the plural magnets fixed thereon. In particular, in a direct drive turbine there may be no gear box between the hub and the generator rotor. The radial forces may act along the radial direction or opposite to the radial direction. Allowing flow of the first electrical current through the first stator winding and allowing flow of the second electric current through the second stator winding may also generate further forces acting for example in the circumferential direction or/and the axial direction. In particular, forces acting in the circumferential direction generated by the first stator winding and the second stator winding may be equal. Since the first magnitude of the first radial force is different from the second magnitude of the second radial force a net generator generated radial force generated by the first stator winding and the second stator winding may result which is different from zero. In particular, the net generator generated radial force may point along the vertical direction downwards thereby producing a generator generated torque in particular counteracting a gravitational force generated torque generated by the gravitational weight of the hub and the rotor blades. Thereby, a load acting on the mechanical bearing between the hub and the generator may be reduced and also noise emissions may be reduced.

According to an embodiment of the present invention the first electric current (or its peak amplitude) is different from the second electric current (or its peak amplitude). In particular, the first converter connected to the first stator winding may be controlled such that the first electric current is different from the second electric current which results from controlling the second converter connected to the second stator winding. Both, the first electric current and the second electric current may be AC currents having a frequency related to the rotational speed of the rotor and depending on the number of generator poles. The first converter and the second converter may be controlled in a known manner to result in the first electric current being different from the second electric current. Thereby, it may be easily achieved that the first radial force has a different magnitude than the second radial force.

According to an embodiment of the present invention the first radial force has a direction different from, in particular opposite to, the second radial force. Thereby, in particular a net generator generated radial force being different from zero may result which may in particular be directed vertically downwards. Thereby, a counter torque generated by the generator may evolve which counteracts the gravitational force induced torque acting on the bearing.

According to an embodiment of the present invention a rotational speed of the generator is equal to a rotational speed of plural rotor blades connected to the rotor, to form a direct drive generator, wherein the first electric current and/or the second electric current is configured such that a mechanical load on a bearing supporting the rotor is reduced.

When the rotational speed of the generator is equal to the rotational speed of the plural rotor blades connected to the rotor, a direct drive turbine may be utilized. In a conventional system any relatively strong bending force may act on the bearing supporting the rotor (the bearing being in particular arranged between the hub at which the plural rotor blades are connected and the generator). In particular, the bearing (which may also be referred to as main bearing of the wind turbine) may have to handle radial, axial and bending forces. Thereby, the axial force (acting along the direction of the rotor or the rotor axis) may be largely given by the aerodynamic thrust force acting on the rotor and the rotor blades. The radial force acting on a conventional bearing may be generated by gravitational forces acting on the rotor, in particular the hub being the end of the rotor at which the plural rotor blades are connected. The gravitational force acting on the rotor may cause a high bending moment around the horizontal axis or x-axis of the bearing. The bending moment may yield a significant part of the loading of the bearing.

According to an embodiment of the present invention the generator is used by controlling the current flow through the first stator segment and controlling the current flow through the second stator segment such that the bending moment acting on the bearing is reduced.

According to an embodiment of the present invention the first radial force and the second radial force result in a net generator generated radial force and the net generator generated radial force results in a counter torque counteracting a gravitational weight induced torque (evolving from the gravitational weight of the hub including the rotor blades) such that a total torque acting on the bearing is reduced. The torque may also be referred to as bending moment. In particular, the bending moment acting along the horizontal axis or horizontal direction (also referred to the x-direction) may be reduced. Thereby, the life time of the bearing may be prolonged or the load may be reduced. Also, the bearing may be dimensioned to be smaller than a conventionally used bearing.

According to an embodiment of the present invention the first stator winding and the second stator winding are circumferential adjacent to each other and form together a complete circumference, wherein in particular the first stator winding is vertically arranged higher than the second stator winding. In particular, the vertical direction may be perpendicular to the x-direction or horizontal direction. The circumferential direction may be perpendicular to the axial direction and may be perpendicular to the radial direction. The first stator winding may form an upper half and the second stator winding may form a lower half of the complete stator. In particular, the first stator winding may cover an angle range of 180° and also the second stator winding may cover an angle range of 180° of a complete circumference. By providing a stator consisting of at least two stator segments transportation of the stator may be simplified. Additionally, the independent stator segments may allow appropriate control of the first stator winding and the second stator winding such as to reduce loads acting on the bearing between the stator and the hub.

According to an embodiment of the present invention the generator comprises at least one further stator winding forming a complete circumference together with the first stator winding and the second stator winding, the method further comprising: allowing flow of at least one further electric current through the at least one further stator winding (in particular comprising a winding for each of three phases), thereby generating at least one further radial force having a further magnitude and acting between the further stator winding and the rotor.

The generator may for example comprise two, three, four, five, six, seven, eight, ten, twelve, fourteen or even more stator windings which are mutually separated and electrically isolated from each other such that independent currents may flow through the respective stator windings. By allowing flow of electric currents through the stator windings (independently) the running condition or running behaviour of the stator may further be improved and also loads acting on the bearings may be reduced. In particular, each stator winding may be connected with a corresponding converter.

According to an embodiment of the present invention the first radial force and the second radial force and in particular the at least one further radial force are generated in order to reduce or maintain a constant air gap between the stator windings and the plural magnets and/or to achieve a fixed deformation of a bearing supporting the rotor and/or to reduce travelling of a wind turbine component, in particular of the generator, the rotor and/or a bearing supporting the rotor and/or to reduce a movement and/or oscillation of a bearing supporting the rotor.

In particular, the air gap between the stator windings and the plural magnets may be different at different circumferential positions or/and at different axial positions in a conventional generator. However, when the currents flowing in the different stator winding are controlled according to embodiments of the present invention the air gap between the stator windings and the plural magnets may be made substantially constant along the complete circumference or/and at different axial positions, in particular during operation. Thereby, the efficiency of the generator may be improved. Further, noise emission may be reduced.

Alternatively or additionally, in a conventional generator the bearing may be deformed in an uneven manner, for example in the circumferential direction, the axial direction or radial direction. By controlling the electric currents flowing through the plural stator windings a fixed deformation of the bearing may be achieved.

Additionally or alternatively a movement or oscillation of one or more wind turbine components which may be mechanically connected to the generator or rotor may be reduced, thereby improving the operation of the generator.

Further, the bearing may move and/or oscillate in a conventional wind turbine. The oscillation and/or movement of the bearing may be reduced by appropriately controlling different electric current flow through the different stator windings.

According to an embodiment of the present invention the first stator winding is connected to a first converter controlling the first electric current (in particular controlling a three phase current), the first converter receiving a first current command, wherein the second stator winding is connected to a second converter controlling the second electric current (in particular controlling a three phase current), the second converter receiving a second current command different from the first current command.

The first converter and also the second converter may be or may comprise an AC-DC-AC converter for converting the variable frequency power stream to a fixed frequency AC power stream. Thereby, the first converter and the second converter may each comprise a number of controllable switches, such as isolated gate bipolar transistors (IGBTs), which may be controlled at their respective gate by pulse width modulation signals. In particular, the converter may comprise an AC-DC portion, a DC link, and a DC-AC portion. Further, the converters may comprise gate driver circuits for providing driving signals to the gates. It is possible that the dc links of the two converters are connected together in some conditions.

By connecting the first converter with the first stator winding and connecting the second converter with the second stator winding a desired first radial force and desired second radial force may be achieved by correspondingly setting or designing the first electric current flowing through the first stator winding and designing or setting the second electric current flowing through the second stator winding.

According to an embodiment of the present invention the first current command is obtained based on a first preliminary current reference and a first supplementary current, wherein the second current command is obtained based on a second preliminary current reference and a second supplementary current, wherein the first supplementary current and/or the second supplementary current are based on at least one input signal, the at least one input signal comprising: a gravitational force and/or a gravitational force generated torque of rotor blades connected to the rotor and/or a net force and/or net torque acting on the bearing, and/or a distance between an axial center of a bearing supporting the rotor and an axial center of the stator windings and/or a rotational position of the rotor, and/or a rotational speed of the rotor and/or a voltage of the generator and/or a power of the generator and/or a torque generated by the generator in rotational (axial) direction and/ or the estimated/measured wind speed, and/or pitch angle of the blades and/or wind shear, wherein in particular the first preliminary current reference equals the second preliminary current reference, wherein in particular the first supplementary current is different from the second supplementary current. Furthermore, the input may also be a desired and measured airgap, desired and measured deformation, oscillation measurement etc. It may be possible also to calculate a desired input signal offline based on the turbine operation point defined e.g. by power, wind speed, and/or pitch angle. Strain measurements (in the tower top/bottom) may also be an input signal. In particular, the input signal may be or comprise one or more turbine operational parameter(s) including power, wind speed, rotational speed, etc.

The first preliminary current reference may substantially corresponds to or be equal to a conventional current reference as generated in a conventional method for controlling a generator. However, the first supplementary current and also the second supplementary current may enable to control the generator such as to reduce the load on the bearing and improve the running properties of the generator. In order to derive the first supplementary current and/or the second supplementary current one or more input signals may be required, which may be supplied to a corresponding control section as an electric and/or optical signal. The at least one input signal may be measured, calculated or estimated. The rotational force of the rotor blades connected to the rotor or the gravitational force of the whole hub including a portion of the rotor and the connected rotor blade may be measured or may be calculated from materials and volume. In particular, the gravitational force may be assumed to be constant. The gravitational force generated torque may be based on the gravitational force and a distance between the center of mass of the hub and the center of the bearing. The net force and/or the net torque acting on the rotor may be the force and/or torque being the sum of the gravitational force and gravitational force generated torque and the forces and torques generated by the generator, in particular generated by the first stator winding and the second stator winding.

The rotational position of the rotor may be constantly measured for example by an encoding wheel. Also the rotational speed of the rotor may be constantly measured, as well as the voltage of the generator and the output power of the generator. The rotational position and speed can also be calculated based on voltage and current measurements. The torque, in particular in the rotational (axial) direction, in the horizontal direction and/or in the vertical direction, generated by the generator at the rotor may be calculated or measured. In a conventional system the first preliminary current reference may be supplied to a converter, in particular a single converter being connected to a single segment generator.

The first supplementary current may be different from the second supplementary current. A first signal based on the first preliminary current reference and the first supplementary current may be supplied to the first converter. A second signal based on the second preliminary current reference and the second supplementary current may be supplied to the second converter. Thereby, the first current signal and the second current signal may be derived based on the at least one input signal in an easy manner.

According to an embodiment of the present invention the at least one input signal is continuously measured, wherein in particular a closed-loop feedback is performed, in order to reduce the net torque, in particular in the horizontal direction, such that the torque induced by the gravitational weight of the hub and the rotor blades acting on the bearing balances the torque induced by the first radial force and the second radial force generated by the first stator winding and the second stator winding, respectively. In particular the net torque in an horizontal direction perpendicular to rotation axis acting on the rotor is reduced when performing the control method according to an embodiment of the present invention.

The net torque (in particular in the horizontal direction, generated by forces in the vertical direction) may be a sum of a gravitational generated torque and a generator generated torque acting on the rotor. Continuously measuring the at least one input signal may enable to even further improve controlling the currents through the first stator winding and the second stator winding, in order to improve the running condition and in order to in particular reduce the loads acting on the bearing.

According to an embodiment of the present invention the first preliminary current reference is added to the first supplementary current in a rotating d-q frame and then transformed into a 3-phase frame before supplying a first transformed signal to the first converter, wherein the second preliminary current reference is added to the second supplementary current in the rotating d-q frame and then transformed into the 3-phase frame before supplying a second transformed signal to the second converter. In the d-q frame (such as obtained by Park's transformation) the quantities may be derived in an appropriate and well known manner. Thereby, obtaining the first current command and obtaining the second current command may be simplified.

It should be understood that features individually or in any combination disclosed, described, mentioned or employed for a method for controlling a generator may also be employed for a generator control system according to embodiments of the present invention and vice versa.

According to an embodiment of the present invention it is provided a generator control system for controlling a generator having a rotor with plural magnets and at least a first stator winding and a second stator winding, electrically separate (isolated) from the first stator winding, the rotor being adapted to rotate, around a rotation axis perpendicular to a radial direction, relative to the stator windings, the control system being adapted to allow flow of a first electric current through the first stator winding, thereby generating a first radial force having a first magnitude and acting between the first stator winding and the rotor, and to allow flow of a second electric current through the second stator winding, thereby generating a second radial force having a first magnitude and acting between the second stator winding and the rotor, wherein the first magnitude is different from the second magnitude.

The generator control system may partly be implemented in hardware and partly be implemented in software. In particular, a conventional controller controlling the first converter and the second converter may be adapted for forming the generator control system.

Embodiments of the present invention are now described with reference to the accompanying drawings. The invention is not restricted to the described or illustrated embodiments.

DETAILED DESCRIPTION

Figure 1:
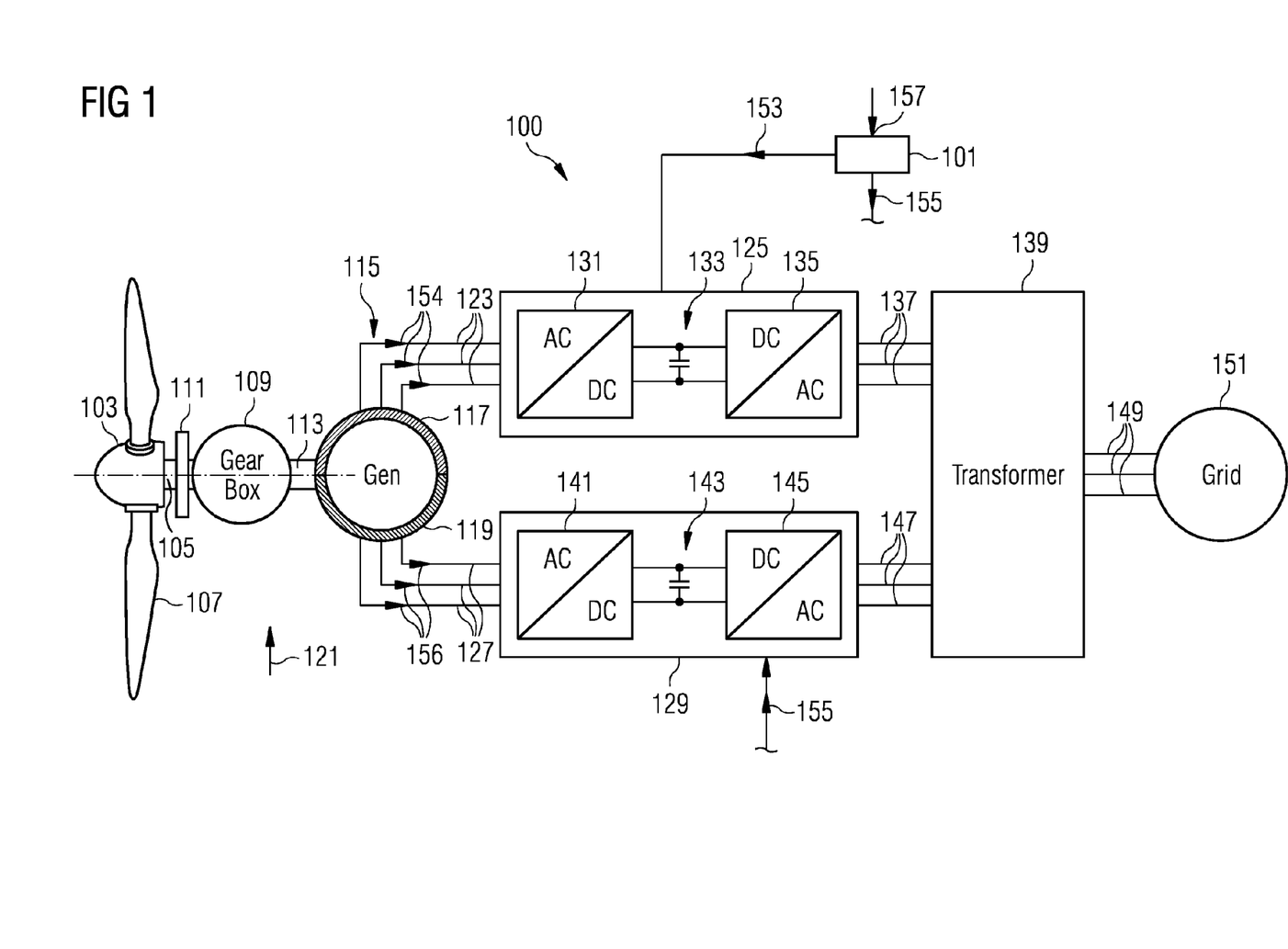
FIG. 1 schematically illustrates a wind turbine which is connected to a utility grid, wherein the wind turbine generator is controlled according to an embodiment of the present invention.

FIG. 1 illustrates a wind turbine 100 which comprises a generator or converter control system 101 according to an embodiment of the present invention and which performs a method for controlling the generator of the wind turbine according to an embodiment of the present invention.

The wind turbine comprises a hub 103 which is connected to a rotor 105, wherein plural rotor blades 107 are connected to the hub. Between the hub 103 and a gear box 109 (which is optional) a bearing 111 is arranged for supporting the rotor 105. A secondary shaft 113 (or the main shaft 105 for a direct drive wind turbine) is mechanically connected to a generator 115 which is constructed from a top generator segment 117 and a bottom generator segment 119. Thereby, the top generator segment 117 is vertically (along the direction 121) above the bottom generator segment 119. In particular, the top generator segment 117 comprises a first stator winding which is electrically separated from a second stator winding comprised in the bottom generator segment 119, as will be illustrated in FIG. 2 and described below.

The generator top segment 117 outputs a power stream in three phases using the output lines 123 and provides the power stream to a first converter 125. The bottom generator segment 119 outputs three phases at output lines 127 to a second converter 129. The first converter 125 comprises a AC-DC portion 131 which generates a DC power stream from the variable frequency AC power stream and provides it to a DC link 133 of the first converter. The DC link 133 provides a DC power stream to a DC-AC portion 135 of the first converter. The DC-AC portion 135 converts the DC power stream to a fix frequency power stream which is provided in three phases using the output lines 137 to a wind turbine transformer 139.

Similarly, the second converter 129 comprises a AC-DC portion 141, a DC link 143 and a DC-AC portion 145 to transform the variable frequency AC power stream received via the lines 127 to a fixed frequency power stream output at the output lines 147 and provided to the wind turbine transformer 139.

The wind turbine transformer 139 transforms the received power stream to a higher voltage and provides the transformed power stream via the output lines 149 to the utility grid 151, optionally via one or more transformers, optionally via a point of common coupling to which a plurality of wind turbines are connected.

The wind turbine 100 comprises the generator/converter control system 101 which provides control signals to the first converter 125 and the second converter 129. In particular, the generator control system 101 provides a first current command 153 to the first converter 125 and provides a second current command 155 to the second converter 129. According to the first current command 153 the first converter 125 allows a first electric current 154 (or peak value) through the first stator winding of the top generator segment 117. According to the second current command 155 the second converter allows flow of a second current 156 through a second stator winding of the bottom generator segment 119. Thereby, the generator control system 101 receives at least one input signal 157 in order to derive the first current command 153 and the second current command 155 as will be described in more detail with reference to FIG. 3 below.

In FIG. 1 the 3-phase winding of each individual generator segment, i.e. the top generator segment 117 and the bottom generator segment 119 is separately controlled by the corresponding frequency converter 125, 129, respectively. Both radial force and tangential force of the two generator segments 117, 119 can be separately controlled by the two converters 125, 129. If the same (control signals)/(winding currents) were applied by the two frequency converters 125, 129, as in a conventional system, the radial electromagnetic forces produced by the two generator segments 170, 190 would be equal. Therefore, the total electromagnetic force produced in the vertical direction 164 or radial direction 164 would be zero.

However, if different stator currents 154, 156 are applied or are allowed to flow through the first stator winding 163 and the second stator winding 165, an electromagnetic force 170 can be produced due to the different radial forces 167 and 169 generated by the two generator segments 117, 119.

Figure 2:
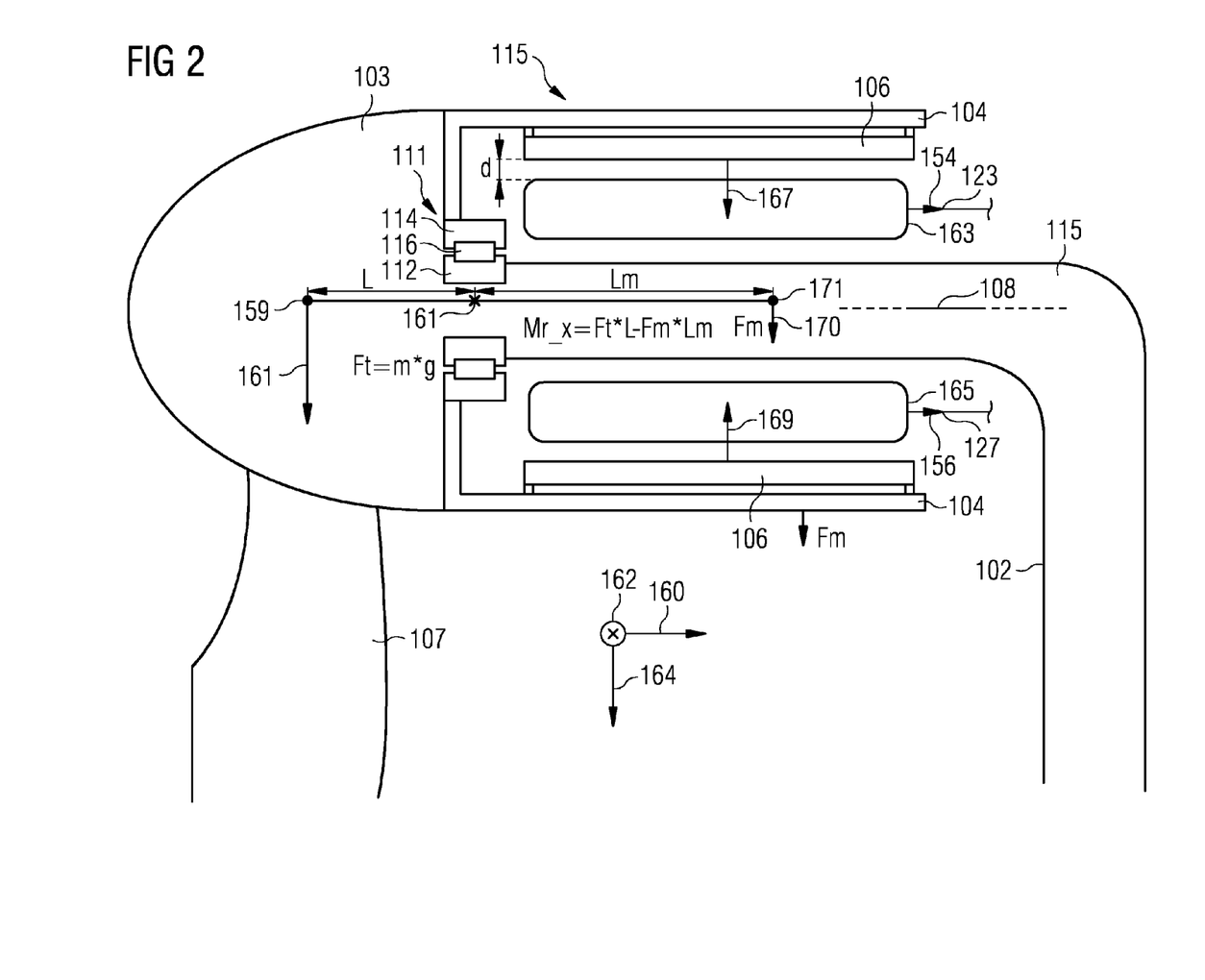
FIG. 2 schematically illustrates a hub, a bearing and a generator of the wind turbine illustrated in FIG. 1, wherein the generator is controlled in order to reduce a bending moment acting on the bearing.

FIG. 2 schematically illustrates a cross-sectional view of the hub, the bearing and the generator of the wind turbine 100 illustrated in FIG. 1. At the hub 103 plural rotor blades 107 are connected. The hub 103 represents a portion of the rotor 105 at which the rotor blades 107 are connected. The hub 103 is mechanically connected to a generator rotor 104 which rotates at the same speed as the hub 103, thereby providing a direct drive wind turbine.

The hub 103 and the generator rotor 104 are supported relative to a stator 115 by a bearing 111. The bearing 111 may for example comprise a roller bearing with a stator portion 112 and a rotor portion 114 which rotate relative to each other. Lubricant and sliding surfaces may be arranged between the stator portion 112 and the rotor portion 114 of the bearing 111. The bearing has rollers 116 between the rotor portion 114 of the bearing 111 and the stator portion 112 of the bearing 111.

At a center of mass 159 of the hub 103 a gravitational force 161 Ft=m*g acts due to the weight m of the hub 103 including the blades 107. The center of mass 159 is spaced apart in the axial direction 160 from a center 161 of the bearing 111 by a distance L. Thereby, the gravitational force 161 generates a torque or bending moment having the magnitude Ft*L and acting in the horizontal direction 162 which is also referred to as the x-direction and pointing out of the drawing plane of the FIG. 2 perpendicular to the drawing plane.

The stator 115 comprises the top generator segment 117 comprising the first stator winding 163 and comprises the bottom generator segment 119 comprising the second stator winding 165. The current 154 flows through the first stator winding 163 and the current 156 flows through the second stator winding 165. In particular, the first current 154 is different from the second current 156, since the first stator winding 163 is connected via the line 123 to the first converter 125 and the second stator winding 165 is connected via the line 127 to the second converter 129 both of which converters control the respective currents.

Due to the first current 154 a first radial force 167 is generated acting between the first stator winding 163 and the generator rotor 104. Due to the second current 156 the second stator winding 165 generates a second radial force 169 acting between the second stator winding 165 and the generator rotor 104. The first radial force 167 is directed opposite to and has a larger magnitude than the second radial force 169. Thereby, a net generator generated radial force 170 (Fm) results acting approximately at the center 171 of the generator windings 163, 165. This center 171 is axially spaced apart from the center 161 of the bearing 111 by a distance Lm. Thus, the generator generates a generator generated torque having the magnitude Fm*Lm, wherein Fm corresponds to the net generator generated radial force 170. By appropriately controlling the currents 154 and 156 flowing through the first stator segment 163 and the second stator segment 165, respectively, the net generator generated radial force 170 is adjusted such that the total torque Mr_x acting in the horizontal direction 162 or x-direction vanishes or is at least considerably reduced. The net torque in the horizontal direction is Mr_x=Ft·L−Fm·Lm.

In FIG. 2 the yokes and teeth of the top generator segment 117 and the bottom generator segment 119 are not illustrated for clarity.

Further, the wind turbine 100 comprises a wind turbine tower 102.

According to another embodiment of the present invention the magnets 106 at the rotor 104 of the generator may be fixed to the nacelle instead of being fixed to the hub 103.

Figure 3:
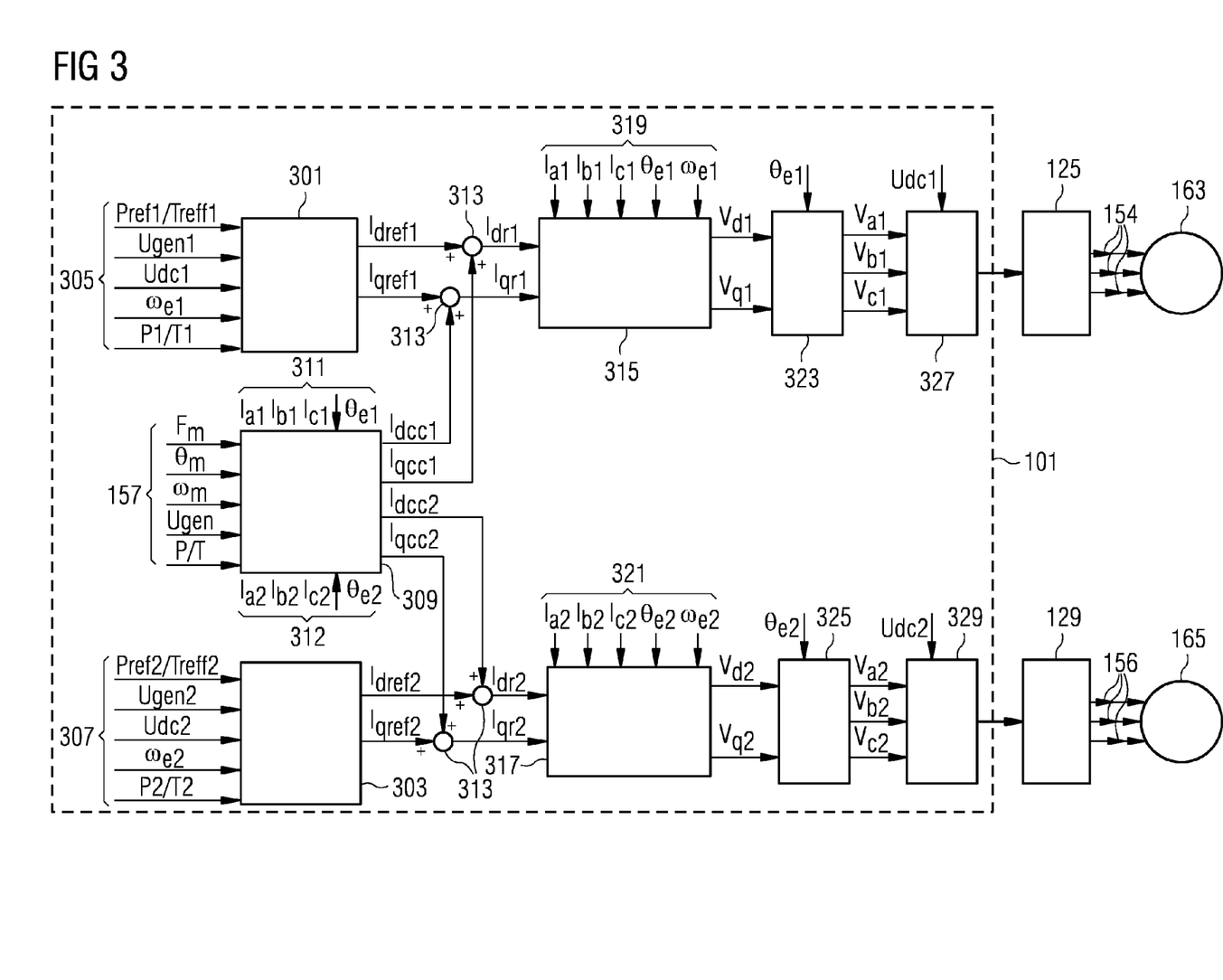
FIG. 3 schematically illustrates a generator control system according to an embodiment of the present invention which is used to control the generator of the wind turbine illustrated in FIG. 1.

FIG. 3 schematically illustrates a more detailed view of the generator control system 101 illustrated in FIG. 1 and used to control the first stator winding 163 and the second stator winding 165 as illustrated in FIG. 2.

Using the generator control system 101 illustrated in FIG. 3 the load acting on the bearing 111 (see FIG. 2) can be reduced. With this control system 101 the generator 115 produces a force in the vertical direction which reduces the bearing load. Thereby, the generator stator segments 117, 119, in particular their windings 163, 165, respectively, are separately controlled by a classic vector control scheme.

The current reference calculation blocks 301 and 303 receive input signals 305 and 307 including a power reference Pref1/2, a torque reference Tref1/2, generator voltage Ugen1/2, DC-voltage Udc1/2, rotational speed $\omega_{e1/2}$, power P1/2, torque T1/2 of the first and second converter, respectively. Based on these input signals 305 and 307, respectively, the current reference calculation module 301 and 303, respectively, calculate segment specific current references $I_{dref1}$ and $I_{qref1}$ in a synchronous rotating d-q frame (via e.g. Park's transformation). Thereby, the input 305, 307 can be power/torque reference, machine voltage, DC link voltage, machine speed and torque/power. It may also be possible to use some combination of the signals as inputs. Current references may be calculated based on optimal torque per Ampere rule, machine voltage controller, flux weakening, etc. which may depend on the application specific requirements.

The generator control system 101 further comprises compensation current calculation block 309 which receives at least one input signal 157. The input signal 157 may include the force $F_m$ (i.e. generated by the windings 163 and 165), the rotational position of the rotor $\Theta_m$, the rotational speed of the generator $\omega_m$, the generator voltage Ugen, the power P and/or torque T. The compensation current calculation block 309 may further receive input such as the currents (Ia1, Ib1, Ic1, Ia2, Ib2, Ic2) flowing for the different phases in the respective stator windings which are denoted as further inputs 311 and 312 originating from the first stator winding 163 and the second stator winding 165, respectively.

The compensation current calculation module 309 outputs compensation current $I_{dcc1}$, $I_{qcc1}$, $I_{dcc2}$, and $I_{qcc2}$ in the d-q frame for the two different generator stator segments based on at least the force command $F_m$, the rotor mechanical position $\Theta_m$ and the mechanical speed $\omega_m$. Using the addition elements 313 the compensation currents are added to basic current commands $I_{dref1}$, $I_{qref1}$ and $I_{dref2}$, $I_{qref2}$, respectively. Thereby, current commands $I_{dr1}$, $I_{qr1}$ and $I_{dr2}$ and $I_{qr2}$, respectively, are created.

The current controller blocks 315, 317 may be used to perform a closed-loop feedback control of the generator segment current in the d-q rotating frame. Thereby, feedback input signals 319, 321 are supplied to the current controllers 315, 317, respectively, in particular including the currents per phase through the stator winding segments 163, 165. Further signals of the inputs 319 include electric angle and speed.

The similar control system can be used for wind turbine generators with more than two stator segments. In this case, current commands of at least two frequency converters need to be modified by the compensation current calculation block 309.

Using a conversion module 323, 325 the signals are transformed into 3-phase signals which are then modulated using the modulators 327, 329 and then supplied separately to the first converter 125 and the second converter 129 which finally allow a particular first current flow 154 through the first stator winding 163 and allow the flow of the second current 156 through the second stator winding 165.

The top generator segment 117 and the bottom generator segment 119 may also be controlled in order to keep the air gap d between the magnets 106 and the stator winding portions 163, 165 constant.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

We claim:

1. A method for controlling a generator, comprising:
   providing a rotor with a plurality of magnets and a first stator winding and a second stator winding, electrically separated from the first stator winding, the rotor being adapted to rotate, around a rotation axis perpendicular to a radial direction relative to the stator windings;
   allowing flow of a first electric current through the first stator winding, thereby generating a first radial force having a first magnitude and acting between the first stator winding and the rotor; and
   allowing flow of a second electric current through the second stator winding, thereby generating a second radial force having a second magnitude and acting between the second stator winding and the rotor,
   wherein the first magnitude is different from the second magnitude resulting in a net generator generated radial force generated by the first stator winding and the second stator winding acting at the rotor.

2. The method according to claim 1, wherein the first electric current is different from the second electric current.

3. The method according to claim 1, wherein the first radial force has a direction different from the second radial force.

4. The method according to claim 1, wherein the first radial force has a direction opposite to the second radial force.

5. The method according to claim 1,
   wherein a first rotational speed of the generator is equal to a second rotational speed of a plurality of rotor blades connected to the rotor, to form a direct drive generator,
   wherein the first electric current and/or the second electric current is configured such that a mechanical load on a bearing supporting the rotor is reduced.

6. The method according to claim 5, wherein the net generator generated radial force generates a counter torque counteracting a gravitational weight torque such that a total torque acting at the bearing is reduced.

7. The method according to claim 1,
   wherein the first stator winding and the second stator winding are circumferential adjacent to each other and form together a complete circumference.

8. The method according to claim 1, wherein the first stator winding is vertically arranged higher than the second stator winding.

9. The method according to claim 1,
   wherein the generator comprises a further stator winding forming a complete circumference together with the first stator winding and the second stator winding, and
   wherein the method further comprises allowing flow of a further electric current through the further stator winding, thereby generating a further radial force having a further magnitude and acting between the further stator winding and the rotor.

10. The method according to claim 1,
    wherein the first radial force, the second radial force, and the further radial force are generated in order to reduce an air gap between the stator windings and the plurality magnets and
    keep a constant air gap along the circumferential direction between the stator windings and the plurality magnets and
    to achieve a fixed deformation of a bearing supporting the rotor and
    to reduce travelling of the generator, the rotor, and a bearing supporting the rotor and
    reduce a movement and oscillation of a bearing supporting the rotor.

11. The method according to claim 1,
    wherein the first radial force and the second radial force are generated in order to reduce an air gap between the stator windings and the plurality magnets or
    keep a constant air gap between the stator windings and the plurality of magnets or
    to achieve a fixed deformation of a bearing supporting the rotor or
    to reduce travelling of a wind turbine component, the rotor or a bearing supporting the rotor or
    reduce a movement or oscillation of a bearing supporting the rotor.

12. The method according to claim 1,
    wherein the first stator winding is connected to a first converter controlling the first electric current, the first converter receiving a first current command, and
    wherein the second stator winding is connected to a second converter controlling the second electric current, the second converter receiving a second current command different from the first current command.

13. The method according to claim 12,
    wherein the first current command is obtained based on a first preliminary current reference and a first supplementary current,
    wherein the second current command is obtained based on a second preliminary current reference and a second supplementary current,
    wherein the first supplementary current and the second supplementary current are based on an input signal, the input signal is selected from the group consisting of:
    a gravitational force, a gravitational force generated torque of rotor blades connected to the rotor,
    a net force and net torque acting on the rotor,
    a distance between an axial center of a bearing supporting the rotor and an axial center of the stator windings,
    a rotational position of the rotor,
    a rotational speed of the rotor,
    a voltage of the generator,
    a power of the generator,
    a torque generated by the generator at the rotor, a desired and measured air gap between the stator windings and the plurality of magnets,
a desired and measured deformation of the bearing,
an oscillation measurement, and
a turbine operational parameter including power and wind speed.

14. The method as claimed in claim 13, wherein the first preliminary current reference equals the second preliminary current reference, and
wherein the first supplementary current is different from the second supplementary current.

15. The method according to claim 13, wherein the input signal is continuously measured.

16. The method according to claim 15, wherein a closed-loop feedback is performed in order to reduce the net torque in a horizontal direction perpendicular to the rotation axis acting on the rotor.

17. The method according to claim 15,
wherein the first preliminary current reference is added to the first supplementary current in a rotating d-q frame and then transformed into a 3-phase frame before supplying a first transformed signal to the first converter, and
wherein the second preliminary current reference is added to the second supplementary current in the rotating d-q frame and then transformed into the 3-phase frame before supplying a second transformed signal to the second converter.

18. A generator control system for controlling a generator, comprising:
a generator, comprising:
a rotor with a plurality of magnets,
a first stator winding,
a second stator winding, electrically isolated from the first stator winding,
wherein the rotor rotates around a rotation axis perpendicular to a radial direction, relative to the stator windings,
wherein the control system allows a first flow of a first electric current through the first stator winding, thereby generating a first radial force having a first magnitude and acting between the first stator winding and the rotor, and
wherein the control system also allows a second flow of a second electric current through the second stator winding, thereby generating a second radial force having a first magnitude and acting between the second stator winding and the rotor, and
wherein the first magnitude is different from the second magnitude.

* * * * *